United States Patent
Mizuno et al.

(10) Patent No.: US 12,047,680 B2
(45) Date of Patent: Jul. 23, 2024

(54) IMAGE PICKUP APPARATUS

(71) Applicant: CANON KABUSHIKI KAISHA, Tokyo (JP)

(72) Inventors: Nobutaka Mizuno, Tokyo (JP); Hirotaro Kikuchi, Tokyo (JP); Yumi Takao, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 91 days.

(21) Appl. No.: 17/527,402

(22) Filed: Nov. 16, 2021

(65) Prior Publication Data
US 2022/0159191 A1     May 19, 2022

(30) Foreign Application Priority Data

Nov. 18, 2020  (JP) .................................. 2020-192053
Jul. 27, 2021   (JP) .................................. 2021-122272

(51) Int. Cl.
*H04N 23/67*    (2023.01)
*G03B 17/14*   (2021.01)
*H04N 23/55*   (2023.01)
*H04N 23/63*   (2023.01)
*H04N 23/68*   (2023.01)

(52) U.S. Cl.
CPC ........... *H04N 23/672* (2023.01); *G03B 17/14* (2013.01); *H04N 23/55* (2023.01); *H04N 23/632* (2023.01); *H04N 23/683* (2023.01)

(58) Field of Classification Search
CPC .... H04N 23/672; H04N 23/55; H04N 23/632; H04N 23/683; H04N 23/67; H04N 23/54; H04N 25/704; G03B 17/14; G03B 2206/00; G02B 7/34
See application file for complete search history.

(56) References Cited

U.S. PATENT DOCUMENTS 5,122,826 A * 6/1992 Kodaka ................... G02B 7/08
                                                              396/93
8,976,286 B2 * 3/2015 Hayashi ............... H04N 25/615
                                                              348/241
(Continued)

FOREIGN PATENT DOCUMENTS

JP           08-29828 A          2/1996
JP     2003029317 A  *   1/2003
(Continued)

*Primary Examiner* — Abdelaaziz Tissire
(74) *Attorney, Agent, or Firm* — Cowan, Liebowitz & Latman, P.C.

(57) ABSTRACT

An image pickup apparatus includes an image sensor including a pair of focus detection pixels configured to receive light beams that have passed through different areas in an exit pupil of an imaging optical system, and at least one processor caused to function as a focus detection unit configured to detect focus of the imaging optical system by using a pair of focus detection signals which is generated by using output signals from the pair of focus detection pixels. The focus detection unit can detect the focus in a plurality of spatial frequency bands. The focus detection unit acquires a focus detection result to be used in a spatial frequency band corresponding to an aberration amount of the imaging optical system, the spatial frequency band being included in the plurality of spatial frequency bands.

12 Claims, 15 Drawing Sheets

(56) References Cited

U.S. PATENT DOCUMENTS

| | | | | |
|---|---|---|---|---|
| 2012/0039595 A1* | 2/2012 | Youn | ................... | G03B 11/04 |
| | | | | 396/529 |
| 2015/0316833 A1* | 11/2015 | Watanabe | ............... | G03B 17/14 |
| | | | | 348/345 |
| 2017/0230567 A1* | 8/2017 | Takao | ................... | H04N 23/672 |
| 2017/0272643 A1* | 9/2017 | Tamaki | ................... | H04N 23/10 |

FOREIGN PATENT DOCUMENTS

| | | | |
|---|---|---|---|
| JP | 2010141814 A * | 6/2010 | |
| JP | 4878978 B2 | 2/2012 | |
| JP | 2014-074851 A | 4/2014 | |
| JP | 5857547 B2 | 2/2016 | |
| JP | 5966426 B2 | 8/2016 | |

* cited by examiner

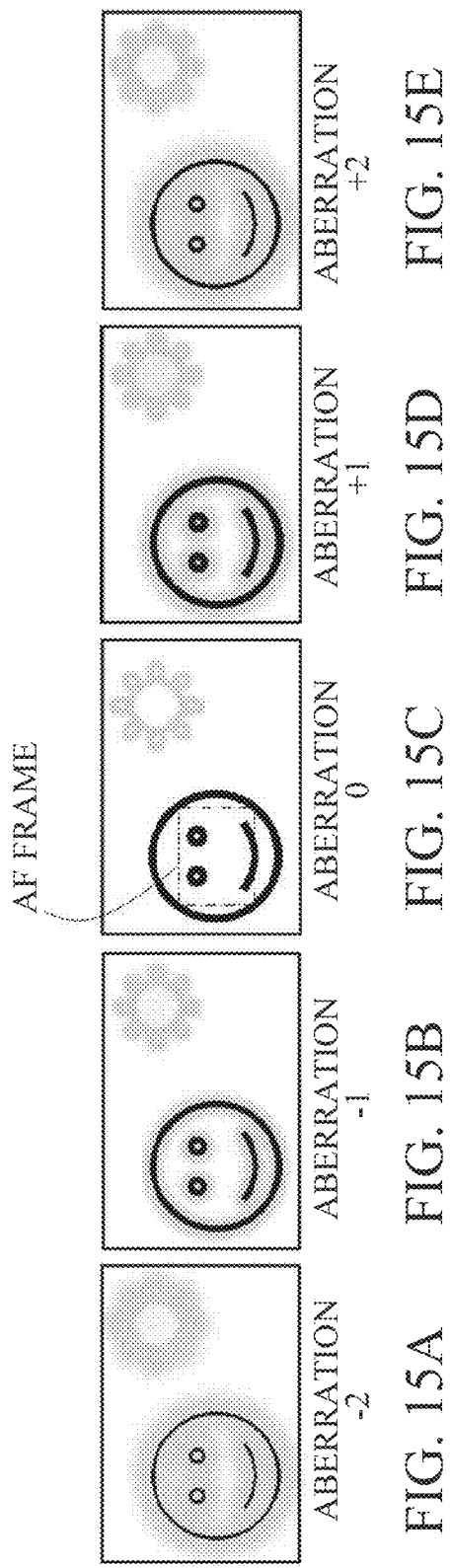

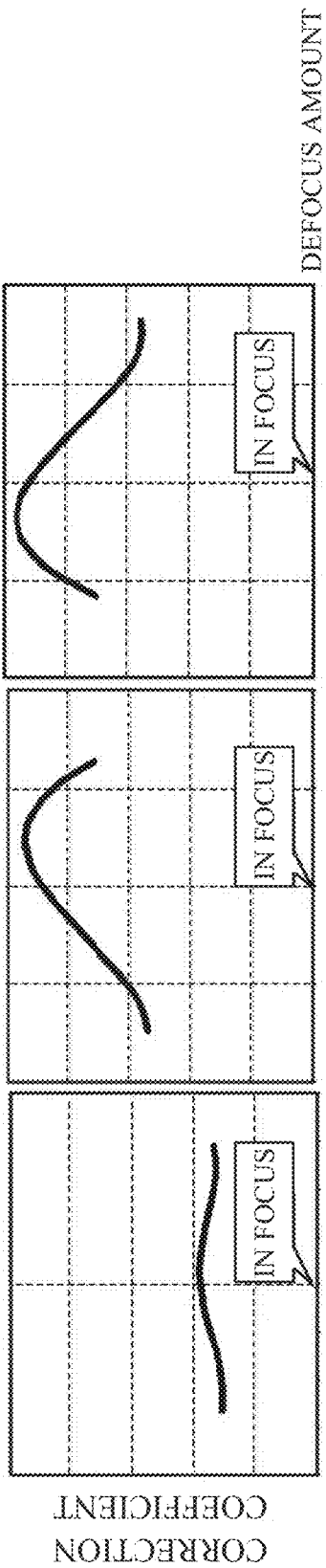

IMAGE PICKUP APPARATUS

BACKGROUND OF THE INVENTION

Field of the Invention

The present disclosure relates to an image pickup apparatus.

Description of the Related Art

A phase difference focus detection method (or a phase difference AF) is known as an autofocus detection (AF) method for an image pickup apparatus. The phase difference AF is often used in digital still cameras, and some of the cameras use image sensors as focus detection sensors. For example, Japanese Patent Application Laid-Open No. ("JP") 2014-74851 discloses a method of reducing an effect of noise by detecting focus with a pupil division method and measuring a distance in a plurality of spatial frequency bands.

Since the phase difference AF uses an optical image to detect the focus, aberration generated in an optical system that forms the optical image may cause an error to a result of the detection of focus (hereinafter, also referred to as a focus detection result). Japanese Patent No. 5966426 discloses a method for correcting an error in the detection of focus (focus detection error) caused in an in-focus state by shapes of a pair of optical images, which is formed by a pair of focus detection light beams, not being matched due to aberration of an optical system.

As a method of changing a degree of soft focus of a lens, Japanese Patent No. 4878978 discloses a method of storing images of a plurality of in-focus degrees and acquiring an image of a desired degree of soft focus by image processing. Further, as a method for acquiring images of a plurality of image pickup conditions. JP H08-029828 discloses a camera that can perform bracketing by setting the number of times of image pickup (number of image pickup times) under a plurality of types of image pickup conditions.

As a method for acquiring a better focus detection accuracy, Japanese Patent No. 5857547 discloses a method of correcting a focus detection error by multiplying a focus detection amount by a correction coefficient.

However, in the phase difference AF, aberration may make it difficult to correct the focus detection error. For example, when a lens called a soft-focus lens which intentionally generates large aberration is used, the focus detection error is large and changes depending on a blur amount, and therefore correction on the focus detection error is difficult.

The method disclosed in Japanese Patent No. 4878978 acquires an image having a desired degree of soft focus by combining images, and thus cannot reproduce blur caused by a distance to an object as in an image obtained by using an actual soft-focus lens, and it is difficult to acquire an image of natural degree of soft focus. Further, in order to acquire the image having the desired degree of soft focus, image pickup at a plurality of in-focus degrees and image processing are required, making a processing load large.

JP H08-029828 discloses that a user can select a desired image from the plurality of images captured by bracketing, but does not describe changing of the degree of soft focus. Japanese Patent No. 5857547 does not describe a method for correcting the defocus amount acquired by detecting focus when the aberration amount of the optical system is large or the aberration amount is variable.

SUMMARY OF THE INVENTION

The present disclosure provides an image pickup apparatus and the like that can acquire a good focus detection result even when focus is detected through an optical system having a large aberration. The present disclosure further provides an image pickup apparatus and the like that can generate an image having a degree of soft focus desired by a user.

An image pickup apparatus according to one aspect of embodiments of the disclosure includes an image sensor including a pair of focus detection pixels configured to receive light beams that have passed through different areas in an exit pupil of an imaging optical system, at least one processor, and at least one memory coupled to the at least one processor storing instructions that, when executed by the at least one processor, cause the at least one processor to function as a focus detection unit configured to detect focus of the imaging optical system by using a pair of focus detection signals which is generated by using output signals from the pair of focus detection pixels. The focus detection unit can detect the focus in a plurality of spatial frequency bands. The focus detection unit acquires a focus detection result to be used in a spatial frequency band corresponding to an aberration amount of the imaging optical system, the spatial frequency band being included in the plurality of spatial frequency bands.

A lens apparatus according to one aspect of the embodiments is detachably attached to the above image pickup apparatus and has an imaging optical system. The lens apparatus includes at least one processor and at least one memory coupled to the at least one processor storing instructions that, when executed by the at least one processor, cause the at least one processor to function as a memory unit configured to store (a) information on an aberration amount of the imaging optical system or (b) information on a spatial frequency band for detecting focus, the spatial frequency band corresponding to the aberration amount, and a notification unit configured to notify the image pickup apparatus of the information.

A lens apparatus according to one aspect of the embodiments is detachably attached to an image pickup apparatus. The lens apparatus includes an operation member configured to receive an operation by a user, an optical member configured to change aberration based on the operation on the operation member, at least one processor, and at least one memory coupled to the at least one processor storing instructions that, when executed by the at least one processor, cause the at least one processor to function as a communication controlling unit configured to communicate with the image pickup apparatus. The communication controlling unit transmits, to the image pickup apparatus, information indicating that the lens apparatus includes the optical member configured to change the aberration. The communication controlling unit transmits information corresponding to an aberration amount that changes based on the operation when the operation member is operated by the user.

An image pickup apparatus according to one aspect of the embodiments includes an image sensor configured to capture an image by receiving a light beam from an imaging optical system and including a pair of focus detection pixels configured to receive light beams that have passed through different areas in an exit pupil of the imaging optical system, at least one processor, and at least one memory coupled to the at least one processor storing instructions that, when executed by the at least one processor, cause the at least one processor to function as a focus detection unit configured to detect focus of the imaging optical system by using a pair of focus detection signals which is generated by using output signals from the pair of focus detection pixels. The imaging optical system can change an aberration amount. The at least one processor is caused to further function as a controlling unit configured to, every time the aberration amount is changed, provide control on focusing of the imaging optical system based on the focus detection result and capture the image.

An image pickup apparatus according to one aspect of the embodiments includes an image sensor including a pair of focus detection pixels configured to receive light beams that have passed through different areas in an exit pupil of an imaging optical system, at least one processor, and at least one memory coupled to the at least one processor storing instructions that, when executed by the at least one processor, cause the at least one processor to function as a focus detection unit configured to detect focus of the imaging optical system by using a pair of focus detection signals which is generated by using output signals from the pair of focus detection pixels, and a controlling unit configured to acquire correction information corresponding to an aberration amount of the imaging optical system and to correct the focus detection result using the correction information.

Control methods for the above image pickup apparatuses and lens apparatuses, and storage mediums storing computer programs that enable computers to execute the control methods also constitute other aspects of the embodiments.

Further features of the present disclosure will become apparent from the following description of exemplary embodiments with reference to the attached drawings.

BRIEF DESCRIPTION OF THE DRAWINGS

FIGS. 15A to 15E are diagrams illustrating pickup images acquired by using an aberration bracketing function according to the third embodiment.

FIGS. 19A to 19C are diagrams illustrating correction coefficients according to the fourth embodiment.

DESCRIPTION OF THE EMBODIMENTS

Referring now to the accompanying drawings, a description will be given of embodiments according to the present invention.

First Embodiment

Figure 1:
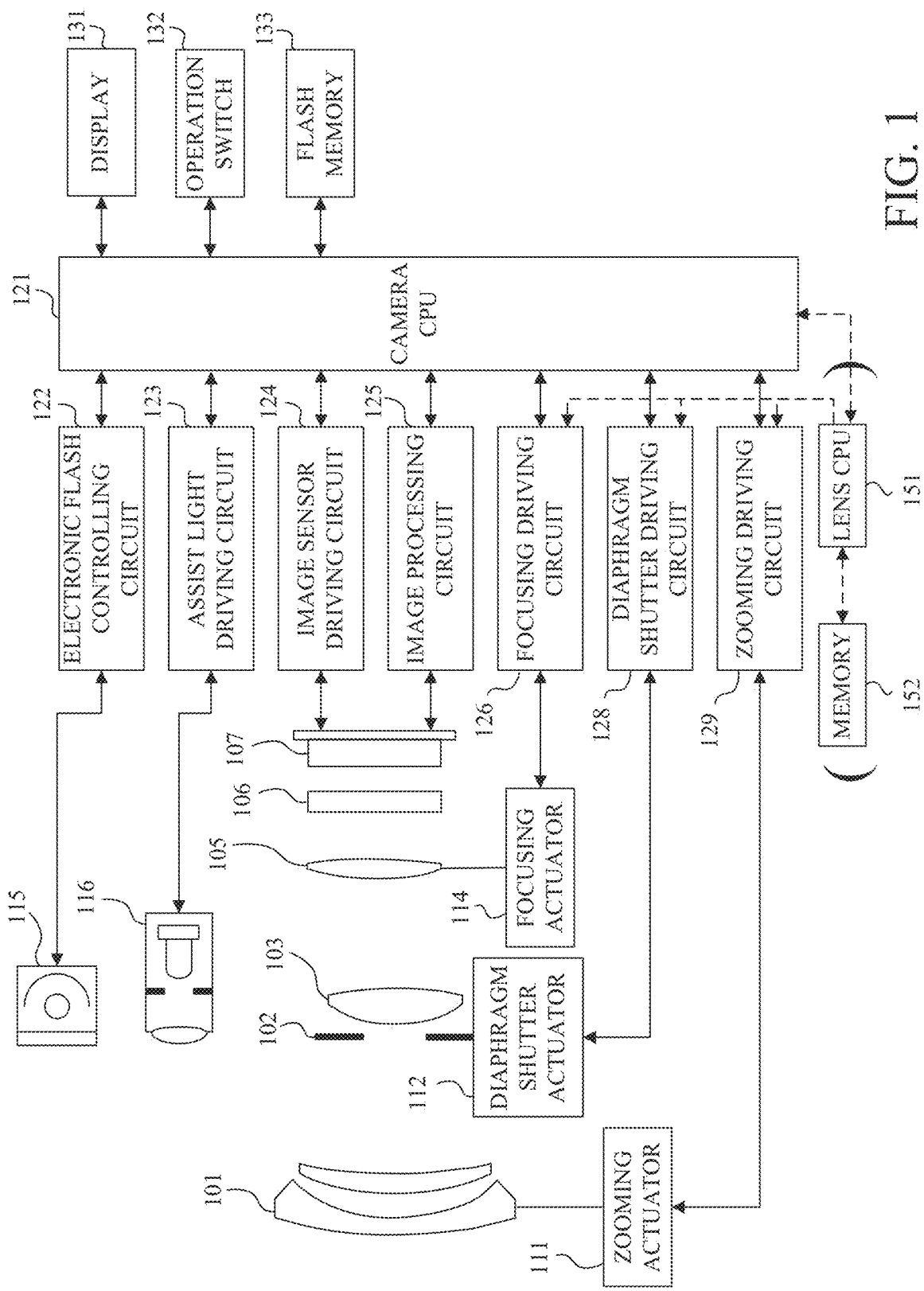
FIG. 1 is a block diagram illustrating a configuration of an image pickup apparatus according to a first embodiment of present disclosure.

FIG. 1 illustrates a configuration of an image pickup apparatus (hereinafter referred to as a camera) according to a first embodiment of the present disclosure. The camera includes an imaging optical system including a first lens unit 101, a diaphragm shutter 102, a second lens unit 103, and a third lens unit 105, which are arranged in order from an object side. The imaging optical system may be provided integrally on a camera body which includes an image sensor described later, or may be provided on a lens apparatus, which is an interchangeable lens detachably attachable to the camera body.

The first lens unit 101 moves in an optical axis direction in which an optical axis of the imaging optical system extends during magnification variation, i.e., zooming. The diaphragm shutter 102 has a diaphragm function of adjusting an amount of light by changing its aperture diameter and has a shutter function of controlling an exposure time in still image pickup. The second lens unit 103 moves in the optical axis direction integrally with the diaphragm shutter 102 during magnification variation. The third lens unit 105 moves in the optical axis direction during focusing. An optical low-pass filter 106 is an optical element for reducing false color and moire. An image sensor 107 includes a two-dimensional CMOS sensor and peripheral circuits, and is disposed on an image plane of the imaging optical system.

A zooming actuator 111 drives the first lens unit 101 and the second lens unit 103 in the optical axis direction by rotating a cum barrel (not illustrated) around the optical axis during magnification variation. A diaphragm shutter actuator 112 drives the diaphragm shutter 102. A focusing actuator 114 drives the third lens unit 105 in the optical axis direction during focusing.

An electronic flash 115 emits light to illuminate the object. An AF flash unit 119 emits, onto an object, an AF assist light which forms a mask image with a predetermined aperture pattern so as to improve a focus detection ability for a shaded or low-contrast object during AF (autofocusing).

A camera CPU 121 is a computer for controlling the entire camera, and controls driving of various circuits of the camera according to a program and controls operations of AF, image pickup, image processing, and recording. The camera CPU 121 stores a correction value calculation coefficient in its internal memory, the correction value calculation coefficient being required in AF using an output signal from the image sensor 107. A plurality of correction value calculation coefficients are prepared for combinations of a focusing state corresponding to a position of the third lens unit 105, a zooming state corresponding to positions of the first lens unit 101 and the second lens unit 103, an aperture value, i.e., an F-number, of the imaging optical system, and a set pupil distance and a pixel size of the image sensor 107. When performing AF, the camera CPU 121 calculates a correction value from an image height on the image sensor 107 and a correction value calculation coefficient that corresponds to a combination of a focusing state, a zooming state, an F-number, a set pupil distance, and a pixel size.

If the imaging optical system is provided in the interchangeable lens, a memory for storing the correction value calculation coefficients may be provided in the interchangeable lens, and the correction value may be calculated by using a correction value calculation coefficient obtained by the camera body from the interchangeable lens when AF is performed.

An electronic flash controlling circuit 122 controls light emission of an electronic flash 115 in synchronization with an image pickup operation. An assist light driving circuit 123 controls light emission of an AF flash unit 116 in synchronization with a focus detection operation for AF. An image sensor driving circuit 124 controls an image pickup, or photoelectric conversion, operation of the image sensor 107, performs A/D conversion on the output signal from the image sensor 107, and transmits the output signal to the camera CPU 121. An image processing circuit 125 generates image data by performing image processing such as y conversion and color interpolation on the A/D converted output signal, which will be also referred to as an image pickup signal, and performs compression processing such as JPEG compression on image data.

A focusing driving circuit 126 drives the third lens unit 105 by controlling the focusing actuator 114 based on an focusing instruction from the camera CPU 121, the focusing instruction being based on a focus detection result. A diaphragm shutter driving circuit 128 drives the diaphragm shutter 102 by controlling the diaphragm shutter actuator 112 based on a diaphragm shutter instruction from the camera CPU 121 that has performed photometry using the image pickup signal. A zooming driving circuit 129 drives the first and second lens units 101 and 103 by controlling the zooming actuator 111 based on a zooming instruction from the camera CPU 121 that has detected a user's zooming operation.

A display 131 includes a display device such as an LCD, and displays various information such as a camera image pickup mode, a preview image before image pickup, an image to be stored after image pickup, a focus detection area which is an AF frame, and an in-focus state. An operation switch group 132 includes a power switch, a release (image pickup trigger) switch, a zooming operation switch, an image pickup mode selection switch, and the like. A flash memory 133 is detachably attachable to the camera and stores an image to be recording.

Figure 2:
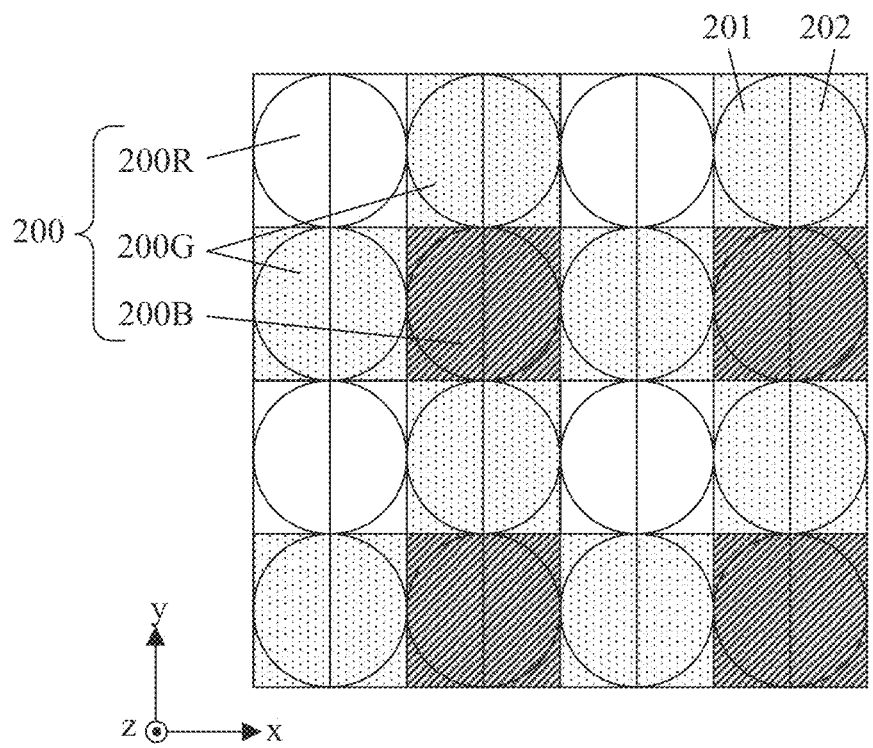
FIG. 2 is a diagram illustrating a pixel array of an image sensor according to the first embodiment.

FIG. 2 illustrates a partial pixel array of the image sensor 107. The image sensor 107 has a plurality of image pickup pixels 200. FIG. 2 illustrates the image pickup pixels 200 of four columns×four rows. The image pickup pixels 200 of two columns–two rows includes an image pickup pixel 200R having an R (red) spectral sensitivity located at the upper left and image pickup pixels 200G each having a G (green) spectral sensitivity located at the upper right and lower left, and an image pickup pixel 200B having a B (blue) spectral sensitivity located at the lower right. Each image pickup pixel 200 includes a pair of focus detection pixels which is divided in an x direction and includes a first focus detection pixel 201 and a second focus detection pixel 202. The image sensor 107 includes multiple image pickup pixels of four columns×four rows illustrated in FIG. 2, i.e., focus detection pixels of eight columns×four rows, on the image pickup surface, which will be also referred to as a light receiving surface, making it possible to acquire the image pickup signal and the focus detection signal.

The camera CPU 121 as a focus detection unit and a controlling unit detects focus of the imaging optical system by using the focus detection signal from the image sensor 107. Thereafter, the camera CPU 121 provides control on focusing by controlling driving of the third lens unit 105 based on a defocus amount which is a focus detection result. In this way, image pickup surface phase difference AF is executed.

Figures 3A, 3B:
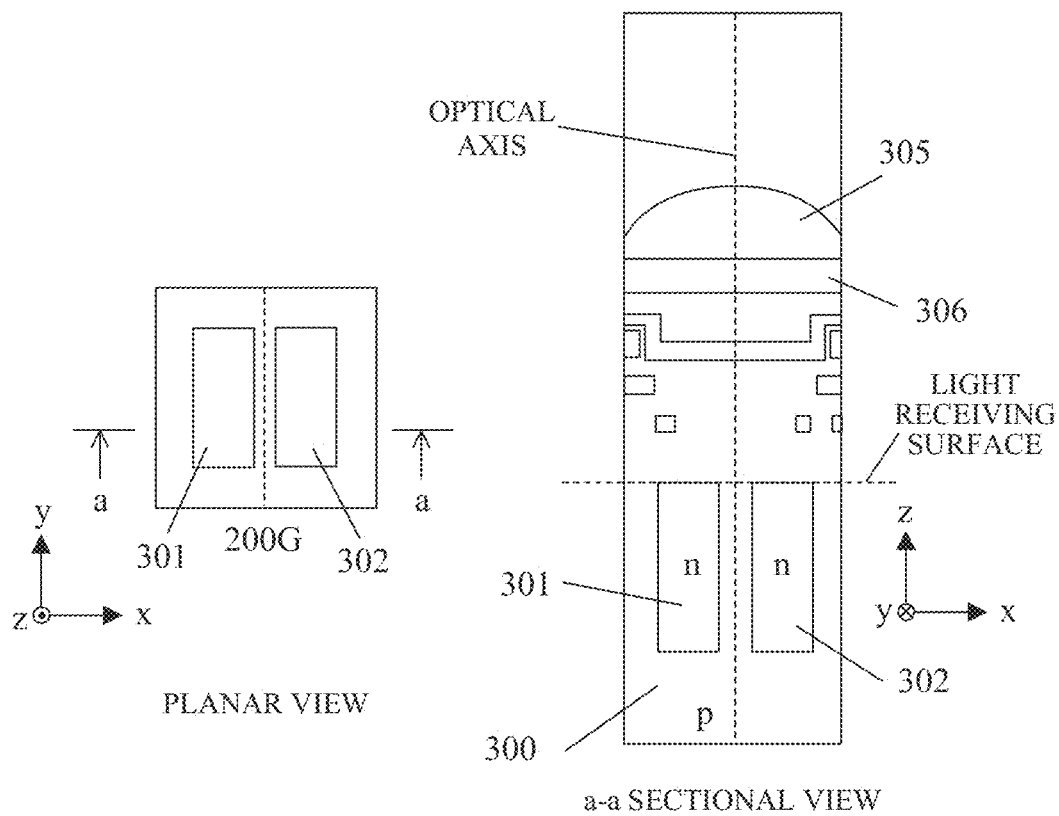
FIGS. 3A and 3B are a planar view and a sectional view each illustrating pixels according to the first embodiment.

FIG. 3A illustrates one image pickup pixel 200G as viewed from a light receiving surface side (+z side) of the image sensor 107, and FIG. 3B illustrates a pixel configuration in a section at a line aa in FIG. 3A, as viewed from a −y side.

As illustrated in FIG. 3B, the image pickup pixel 200G includes photoelectric converters 301 and 302 divided into $N_H$ (divided into two) in an x direction, and these photoelectric converters 301 and 302 correspond to the first and second focus detection pixels 201 and 202 illustrated in FIG. 2, respectively. The photoelectric converters 301 and 302 may be divided into $N_V$ in they direction. The image pickup pixel 200G is formed with a micro lens 305 for collecting light entering the photoelectric converters 301 and 302. The photoelectric converters 301 and 302 may be PIN photodiodes in each of which an intrinsic layer is sandwiched between a p-type layer and an n-type layer, or may be p-n junction photodiodes in each of which the intrinsic layer is omitted.

A color filter 306 for G is formed between the micro lens 305 and the photoelectric converters 301 and 302. In the image pickup pixels 200R and 200B, color filters for R and B are formed, respectively. A color filter for a color other than R, G, and B may be provided, or the color filters may be omitted.

The light entering the image pickup pixel 200G is collected by the micro lens 305, separated by the color filter 306, and thereafter received by the photoelectric converters 301 and 302. In the photoelectric converters 301 and 302, pairs of electrons and holes are generated correspondingly to a light receiving amount, and after these pairs are separated by a depletion layer, negatively charged electrons are accumulated in an n-type layer. On the other hand, the holes are discharged to the outside of the image sensor 107 through a p-type layer connected to a constant voltage source (not illustrated). The electrons stored in the n-type layer of the photoelectric converters 301 and 302 are transferred to an electrostatic capacitor (FD) via a transfer gate and converted into a voltage signal.

Figure 4:
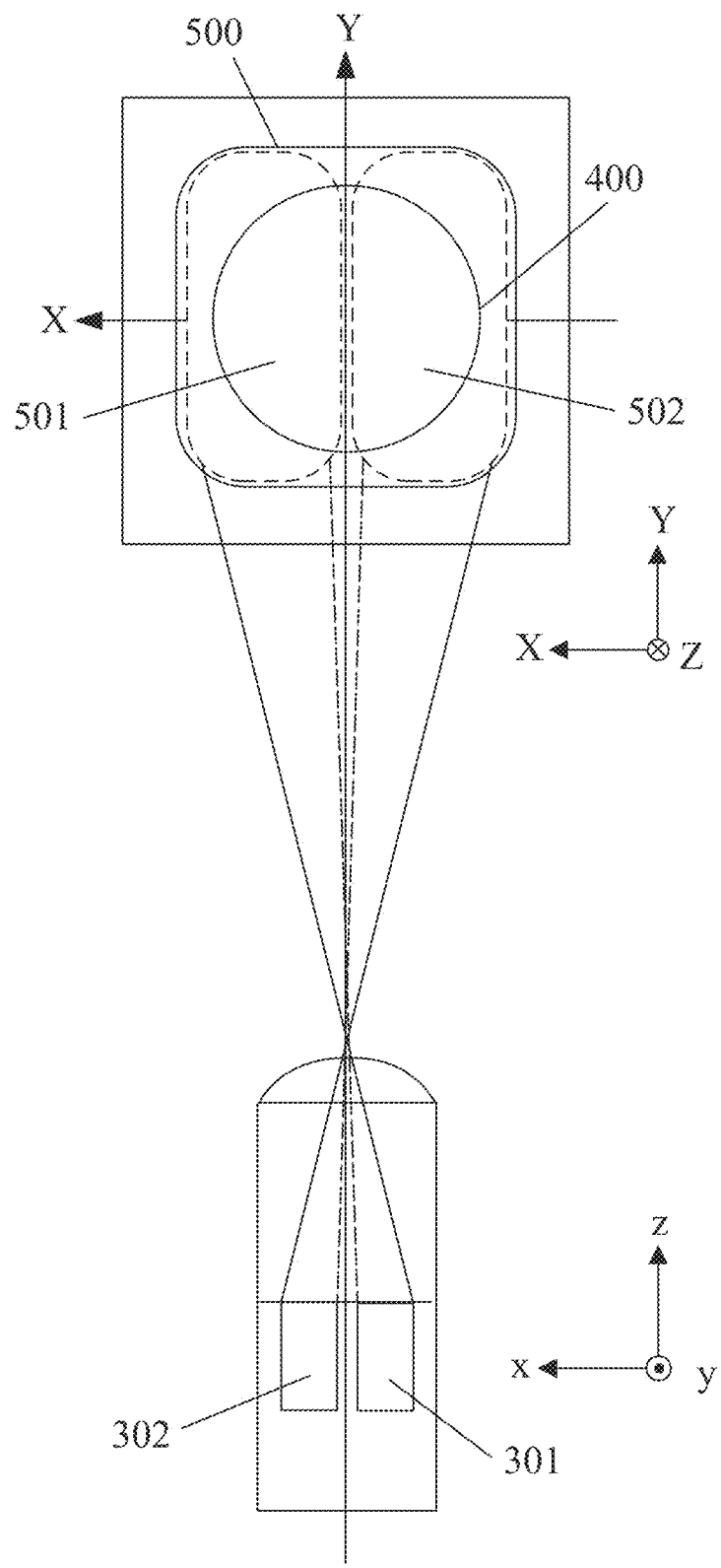
FIG. 4 is a diagram illustrating pixels and pupil division according to the first embodiment.

FIG. 4 illustrates a relationship between the pixel configuration illustrated in FIG. 3B and division of an exit pupil of the imaging optical system which will be also referred to as pupil division. In FIG. 4, the x-axis and y-axis of the pixel configuration are inverted with respect to FIG. 3B so that coordinate axes of the pixel configuration correspond to coordinate axes of a partial pupil surface.

A first partial pupil area 501 is an area through which the light received by the photoelectric converter 301 (first focus detection pixel 201) of the exit pupil area 500 passes, and is generally in a conjugate relationship between the micro lens 305 and the light receiving surface of the photoelectric converter 301 whose center of gravity is eccentric in the −x direction. A center of gravity of the first partial pupil area 501 is eccentric to a +X side on the partial pupil surface. A second partial pupil area 502 is an area through which the light received by the photoelectric converter 302 (second focus detection pixel 202) of the exit pupil area 500 passes, and is generally in a conjugate relationship between the micro lens 305 and the light receiving surface of the photoelectric converter 302 whose center of gravity is eccentric in the +x direction. The center of gravity of the second partial pupil area 502 is eccentric to the −X side on the partial pupil surface. The light passing through the exit pupil area 500 can be received by the entire image pickup pixel 200G including the photoelectric converters 301 and 302.

The image pickup surface phase difference AF is affected by diffraction because the pupil division is performed by using the micro lens 305 provided for each image pickup pixel of the image sensor 107. In FIG. 4, distances, which are pupil distances, from the respective light receiving surfaces to the respective partial pupil surfaces of the photoelectric converters is several tens of mm, whereas a diameter of the micro lens 305 is several μm. Hence, an aperture value of the micro lens 305 is tens of thousands, and diffraction blur of several tens of mm order occurs. Therefore, an optical image formed on the light receiving surface of the photoelectric converter is not a clear image of the exit pupil area or of the partial pupil area, but is an image having an intensity distribution corresponding to a light receiving rate corresponding to their incident angles.

Figure 5:
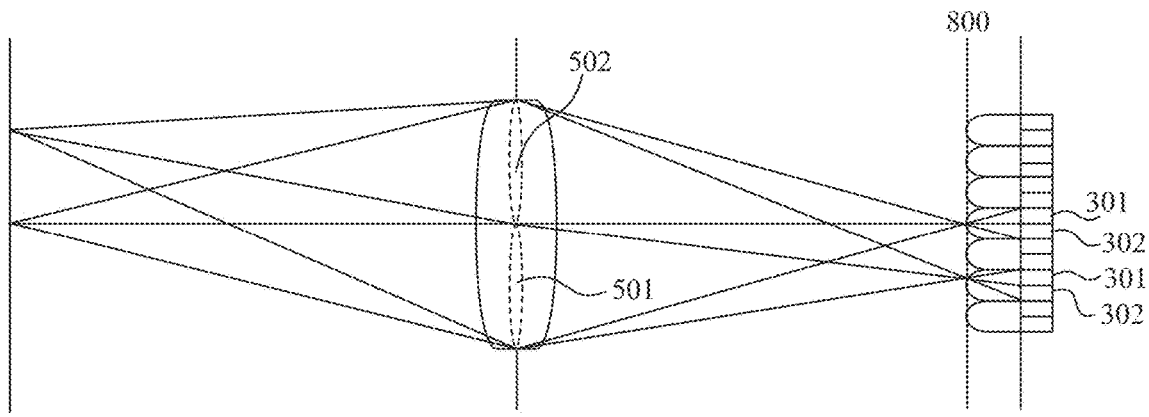
FIG. 5 is a diagram illustrating an image sensor and a pupil division according to the first embodiment.

FIG. 5 illustrates light beams entering the image sensor 107 in the pupil division. The light beams that have passed through the first partial pupil area 501 and the second partial pupil area 502 enter the corresponding photoelectric converters 301 and 302 in the image sensor 107 at different angles, respectively.

The image sensor 107 in this embodiment includes the first focus detection pixel 201 (photoelectric converter 301) which receives the light beam that has passed through the first partial pupil area 501 of the imaging optical system, and the second focus detection pixel 202 (photoelectric converter 302) which receives the light beam that has passed through the second partial pupil area 502. The image sensor 107 further includes the image pickup pixel 200 which receives the light beam that has passed through the exit pupil area 500 including the first partial pupil area 501 and the second partial pupil area 502. In this embodiment, each image pickup pixel includes the first and second focus detection pixels 201 and 202, but the image pickup pixel and the first and second focus detection pixels may be provided separately as different pixels.

In this embodiment, the output signals from the respective first focus detection pixels 201 of the plurality of image pickup pixels 200 are collected to generate a first focus detection signal, and the output signal from the respective second focus detection pixels 202 of the plurality of image pickup pixels 200 are collected to generate a second focus detection signal. The camera CPU 121 uses a pair of first and second focus detection signals to detect focus during the image pickup surface phase difference AF. The camera CPU 121 adds the output signals from the first and second focus detection pixels 201 and 202 of each image pickup pixel 200 and generates an image pickup signal with a resolution of N effective pixels.

Figure 6:
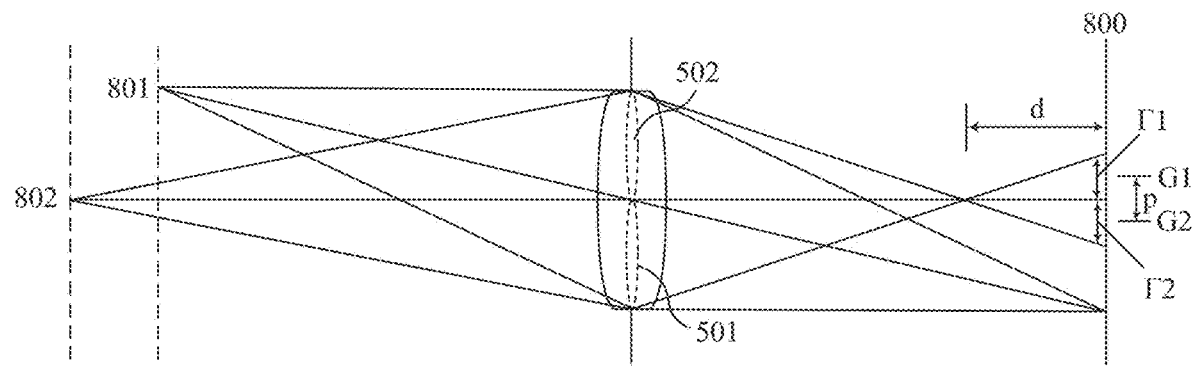
FIG. 6 is a diagram illustrating a relationship between a defocus amount and an image shift amount of a first focus detection signal and a second focus detection signal according to the first embodiment.

Next, a description will be given of a relationship between a phase difference, i.e., an image shift amount, of the first and second focus detection signals and a defocus amount of the object image with reference to FIG. 6. In the drawing, the light beams, which have passed through the first and second partial pupil areas 501 and 502 of the imaging optical system from object surfaces 801 and 802, reach an image pickup surface 800 of the image sensor 107.

A defocus amount d is a distance from an imaging position of the object image to the image pickup surface 800. A front focus state in which the imaging position is on the object side of the image pickup surface 800 is represented by a negative defocus amount (d<0), and a rear focus state in which the imaging position is on a side opposite to the object side of the image pickup surface 800 is represented by a positive defocus amount (d>0). An in-focus state where the imaging position is on the image pickup surface 800 is represented by d=0. The drawing illustrates the in-focus state for the object surface 801 and the front focus state for the object surface 802. In the following description, the front focus state (d<0) and the rear focus state (d>0) are collectively referred to as a defocus state (|d|>0).

In the front focus state, of the light beams from the object surface 802, the light beams that have passed through the first and second partial pupil areas 501 and 502 are focused once and then spread to widths of Γ1 and Γ2 centered on center of gravity positions G1 and G2 of the light beams, and form a blurred image on the image pickup surface 800. The blurred image is received by the first and second focus detection pixels 201 and 202 of the image sensor 107, which generates first and second focus detection signals. The first and second focus detection signals are signals indicating the blurred image of the object surface 802 that has been spread by the blur widths Γ1 and Γ2 centered on the center of gravity positions G1 and G2 on the image pickup surface 800. The blur widths Γ1 and Γ2 increase almost proportionally as a magnitude |d| of the defocus amount d increases. A magnitude |p| of an image shift amount p, which is a difference between the positions of the center of gravities G1 and G2, of the first and second focus detection signals also increases almost proportionally as the |d| increases. In the rear focus state, image shift directions of the first and second focus detection signals are opposite to those in the front focus state, but the other details are the same as those in the front focus state.

Therefore, the defocus amount d can be calculated by using the image shift amount p and a predetermined conversion coefficient K for converting the image shift amount p into the defocus amount d.

Figure 7:
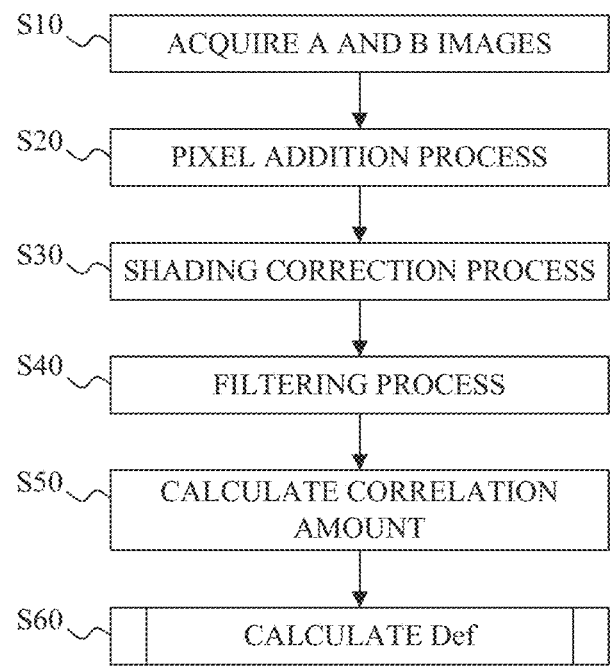
FIG. 7 is a flowchart illustrating a focus detection process and an image pickup process according to the first embodiment.

A flowchart in FIG. 7 illustrates a focus detection process in this embodiment. The camera CPU 121 executes this process according to a computer program. Here, as the first and second focus detection signals, a Y signal is used which is obtained by adding the first and second focus detection signals of the four image pickup pixels of G, R, B. and G.

In step S10, the camera CPU 121 generates a first focus detection signal, which will be also referred to as an A image, from the output signal from the first focus detection pixel in the focus detection area of the image sensor 107 and generates a second focus detection signal, which will be also referred to as a B image, from the output signal from the second focus detection pixel in the same focus detection area.

Next, in step S20, the camera CPU 121 performs an addition process in the column direction so as to reduce an amount of signal data in the first and second focus detection signals. The camera CPU 121 further performs an addition process on the G, R, B, and G focus detection signals to generate the Y signal. These two addition processes are collectively referred to as a pixel addition process. When two pixels are added, a pixel pitch are doubled, and thus a Nyquist frequency is reduced to half of a Nyquist frequency when the pixels are not added. When three pixels are added, the pixel pitch is tripled, and thus the Nyquist frequency is reduced to one-third of the Nyquist frequency when the pixels are not added.

Next, in step S30, the camera CPU 121 performs a shading correction process, which is an optical correction process, on the first and second detection signals for matching intensities of the first and second focus detection signals.

Next, in step S40, the camera CPU 121 performs a bandpass filtering process on the first and second focus detection signals in a specific passing frequency band so as to improve their correlation. i.e., a signal matching degree, and to improve focus detection accuracy. For example, the bandpass filtering process is differential filtering process such as {1, 4, 4, 4, 0, −4, −4, −4, −1} which cuts DC components and extracts edges, or an additive filtering process such as {1, 2, 1} which reduces high-frequency noise components.

Next, in step S50, the camera CPU 121 performs a shift process which shifts the first and second focus detection signals after the bandpass filter process relatively in the pupil division direction, and calculates a correlation amount indicating the matching degree of these first and second focus detection signals.

It is assumed that A (k) represents a k-th first focus detection signal after the bandpass filtering process, B (k) represents a k-th second focus detection signal after the bandpass filtering process, and W represents a range of the number k corresponding to the focus detection area. When s represents a shift amount by the shift process and r represents a shift range of the shift amount s, a correlation amount COR is calculated by an equation (1).

$$COR(s) = \Sigma_{k \in W} |A(k) - B(k-s)|, s \in \Gamma \quad (1)$$

By the shift process of the shift amount s, a shift subtraction signal is generated by subtracting the k-th first focus detection signal A (k) from the (k−s)-th second focus detection signal B (k−s). The correlation amount COR (s) is calculated by calculating an absolute value of the generated shift subtraction signal and adding the numbers k within the range W which corresponds to the focus detection area. If necessary, the correlation amount calculated for each row may be added over a plurality of rows for each shift amount.

Next, in step S60, the camera CPU 121 calculates a real value of the shift amount s at which the correlation amount COR (s) takes the minimum value by using a sub-pixel calculation, and sets that as the image shift amount p. The camera CPU 121 calculates the defocus amount (Def) d by multiplying the image shift amount p by the conversion coefficient K. In this way, the defocus amount is detected.

Figure 8:
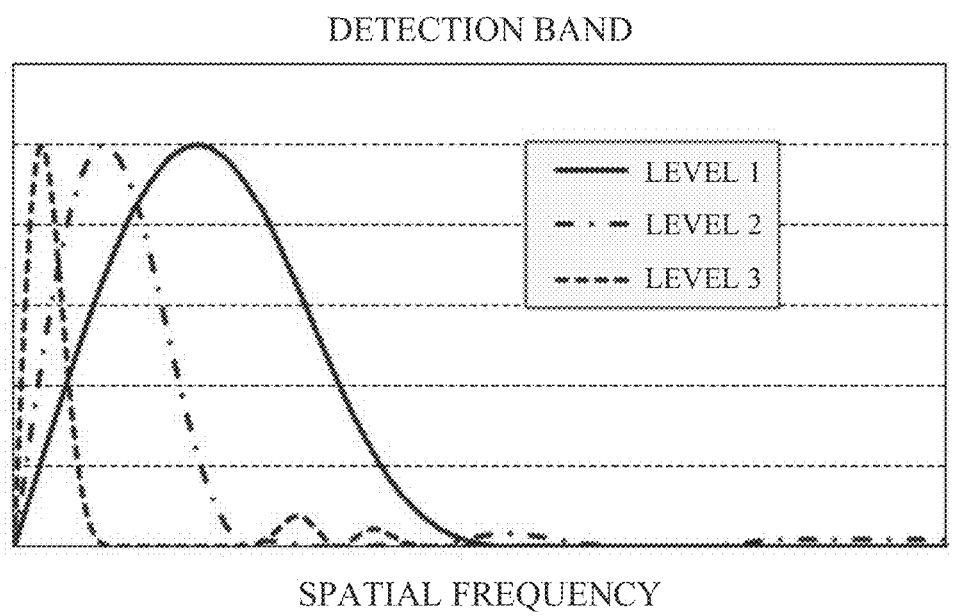
FIG. 8 is a diagram illustrating a spatial frequency band for focus detection according to the first embodiment.

In this embodiment, the defocus amount is detected by a plurality of (here, three) spatial frequency bands of respective levels different from each other. The spatial frequency band is determined depending on the number of pixels added in step S20 and on the bandpass filtering process in step S40. The higher the number of pixels added and the lower a transmission band in the bandpass filtering process, the lower the spatial frequency band that detects the defocus amount. FIG. 8 illustrates spatial frequency bands of levels 1, 2, and 3. The spatial frequency band of the level 1 is the highest, and the spatial frequency band of the level 3 is the lowest.

The number of spatial frequency bands is not limited to three, and may be other numbers. Also, it is not necessary to detect the defocus amount at the same time in the plurality of spatial frequency bands.

Figure 9:
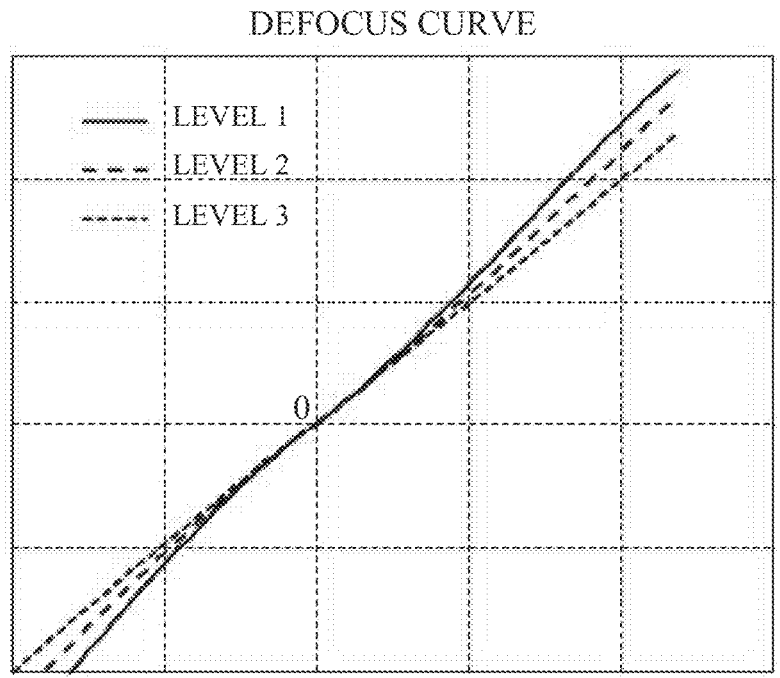
FIG. 9 is a diagram illustrating a defocus curve in a conventional imaging optical system.

The focus detection accuracy in phase difference AF is expressed by a defocus curve. FIG. 9 illustrates an example of a general defocus curve based on an optical calculation result. A solid line, a broken line, and a thin broken line indicate detection results of defocus amounts in the spatial frequency bands of the above-described levels 1, 2, and 3. A horizontal axis represents a correct defocus amount, and a vertical axis represents a detected defocus amount. An ideal state in which a detection error is 0 is a state in which values on the horizontal axis and values on the vertical axis are always equal, that is, values draw a straight line having an angle of 45° with respect to the vertical and horizontal axes.

In FIG. 9, in an area where the defocus amount is large, the results of the defocus amounts in the spatial frequency bands of three levels are different, but almost match the straight line of 45°. In the vicinity of the in-focus state where the defocus amount is 0, the detection errors are small in the detection results of the defocus amounts in all of the spatial frequency bands of levels 1 to 3. Generally, for reducing a variation in the detection results caused by noise, a detection result of a defocus amount in a spatial frequency band as high as possible is used for a final focus determination.

Figure 10:
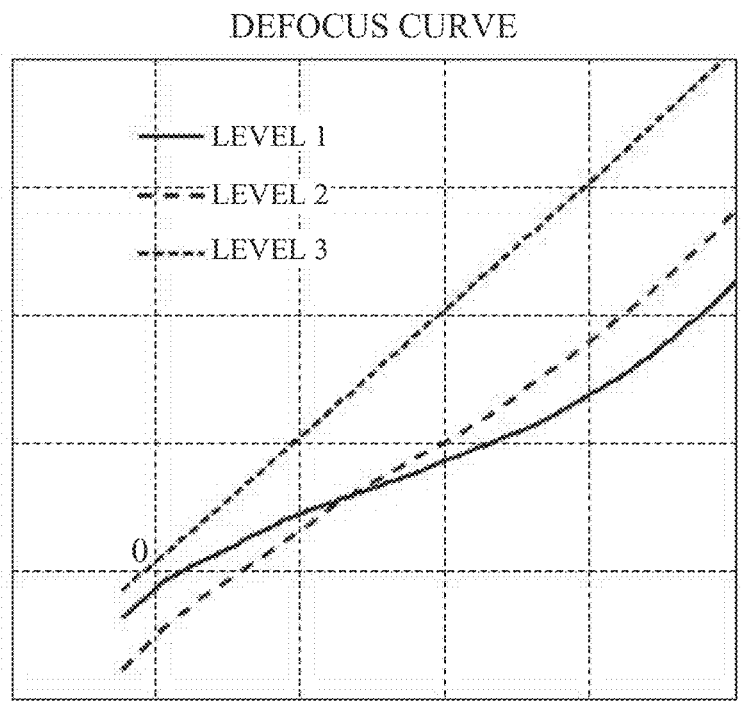
FIG. 10 is a diagram illustrating a defocus curve in an imaging optical system with a large aberration.

FIG. 10 illustrates an example of a defocus curve based on the optical calculation result in an imaging optical system having a large spherical aberration which is one of various aberrations. In the highest spatial frequency band of the level 1, a defocus curve deviates greatly from the straight line of 45°, indicating that a detection error is large, and further, the defocus curve has a curved shape, indicating that the detection error varies depending on the defocus amount. In the levels 2 and 3, the lower the spatial frequency bands, the closer defocus curves are to straight lines, that is, the smaller the detection error.

In general, the image formed by the imaging optical system in which a large spherical aberration occurs is blurred even in the vicinity of the in-focus state, and increase in a blur amount is small even if the defocus amount increases. When the spatial frequency band is high, an edge of a line image having a small change caused by defocus is detected, and when the spatial frequency band is low, a change in an entire image is detected. Therefore, a good defocus amount detection result can be acquired in an imaging optical system in which the spherical aberration increases as the spatial frequency band lowers.

Figure 12:
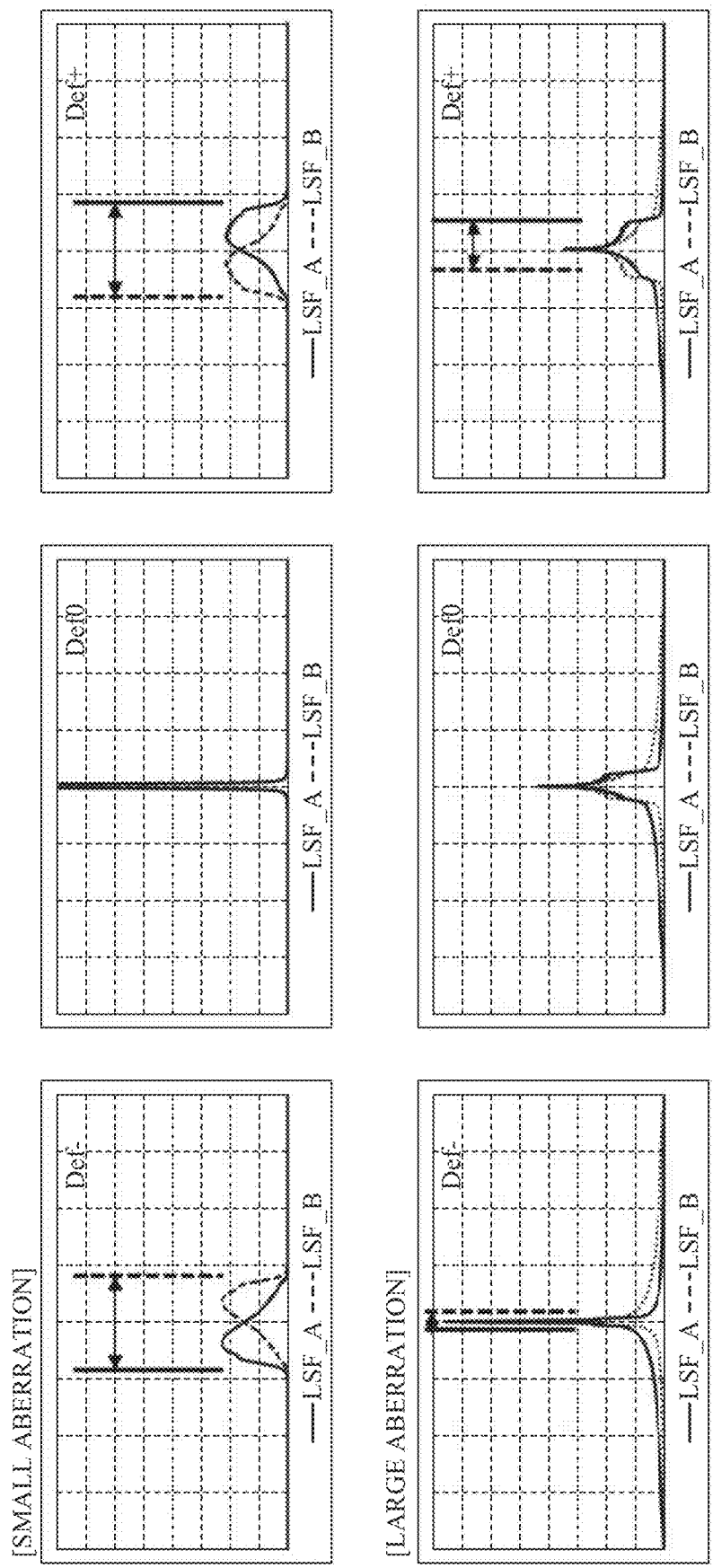
FIG. 12 is a diagram illustrating a comparative example of LSF according to the first embodiment.

FIG. 12 illustrates an LSF (line image) in this embodiment. The first focus detection signal is represented by LSF_A, and the second focus detection signal is represented by LSF_B. Def0 indicates an in-focus state, and Def− and Def+ indicate a state in which blur occur on the front focus side and the rear focus side, respectively, amounts of the blur being same in the Def− and Def+. In an imaging optical system with small aberration as in FIG. 9. LSF_A and LAF_B almost match in the in-focus state, and in Def− and Def+, the positions of LSF_A and LSF_B are switched, but the distances between them are almost the same. The LSF of the image pickup signal is acquired by adding LSF_A and LSF_B.

On the other hand, in an imaging optical system in which large aberration occurs as in FIG. 10, a deformation and asymmetry of LSF_A and LSF_B are large, and the shapes of LSF_A and LAF_B do not match even in the in-focus state, making the detection error large. The distance between LSF_A and LSF_B in Def− is correct in the small aberration, but the distance between LSF_A and LSF_B in the large aberration is smaller than the correct distance. The distance between LSF_A and LSF_B in Def+ is correct in the small aberration, but the distance between LSF_A and LSF_B in the large aberration is larger than the correct distance.

As described above, in a case of the large aberration, since the deformation and asymmetry of the LSF occur, the detection error is large and the detection error amount changes depending on the defocus amount in the high frequency band in which the edge is detected.

In this embodiment, in order to acquire good focus detection accuracy even if an imaging optical system in which a large aberration occurs is used, a defocus amount is used that is detected in a spatial frequency band corresponding to the information on the aberration amount of the imaging optical system, the spatial frequency band being included in the plurality of spatial frequency bands.

In the following description, the imaging optical system is provided on the interchangeable lens, and a description will be given of a case where the interchangeable lens is a soft-focus lens capable of changing, or variably setting, the spherical aberration amount of the imaging optical system. The interchangeable lens in this case includes a lens CPU 151 in parentheses in FIG. 1. The lens CPU 151, which is a computer, can communicate with the camera CPU 121 and controls the focusing driving circuit 126, the diaphragm shutter driving circuit 128, and the zooming driving circuit 129 provided in the interchangeable lens according to an instruction from the camera CPU 121. The lens memory 152 as a memory unit similarly illustrated in the parentheses in FIG. 1 stores various lens information, which can be variably set, such as the spherical aberration amount of the imaging optical system. The lens CPU 151 as a notification unit can notify the camera body (camera CPU 121) of information on the variably set spherical aberration amount via communication.

Figure 11:
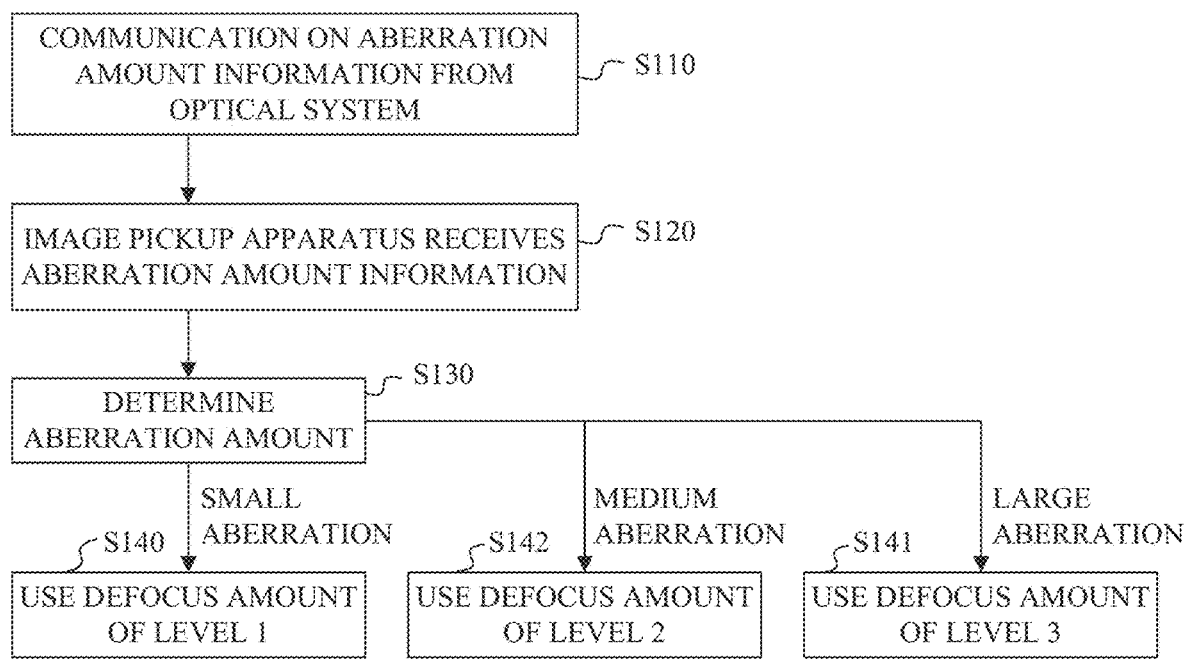
FIG. 11 is a flowchart illustrating a band selecting process according to the first embodiment.

The flowchart of FIG. 11 illustrates a band selecting process (control method) that the camera CPU 121 executes according to a computer program. In step S110, when the lens CPU 151 transmits to the camera, or notifies the camera of, information on the aberration amount of the imaging optical system, which will be referred to as aberration amount information, the camera CPU 121 receives the aberration amount information in step S120.

The aberration amount information may be information indicating an actual aberration amount or an index indicating a magnitude of the aberration amount. The aberration amount information may be information indicating a magnitude of wavefront aberration, or may be the information indicating a magnitude of an aberration amount in binary. When the camera CPU 121 recognizes that the interchangeable lens is a soft-focus lens using identification information such as a lens ID, the aberration set value of the soft-focus lens may be acquired as the aberration amount information.

Next, in step S130, the camera CPU 121 determines whether the aberration amount indicated by the aberration amount information is small, medium, or large. When the aberration amount is small, the process proceeds to step S140, and the camera CPU 121 selects the defocus amount in the spatial frequency area of level 1 for AF. When the aberration is large, the process proceeds to step S141, the camera CPU 121 selects the defocus amount in the spatial frequency area of level 3 for AF. When the aberration amount is medium, the process proceeds to step S142, and the camera CPU 121 selects the defocus amount in the spatial frequency area of level 2 for AF.

That is, the camera CPU 121 detects the defocus amount used for AF in the spatial frequency band corresponding to the aberration amount.

A description has been given of the case where the imaging optical system is the soft-focus lens, but the lens may not be a lens of a variable aberration type such as a soft-focus lens, as long as an imaging optical system generates large aberration. Even when the aberration is set to large, the aberration is reduced if the F-number is large. Therefore, the spatial frequency band selected for AF may be changed depending on the F-number. When the F-number is large, information indicating that the aberration amount is small may be transmitted from the soft-focus lens to the camera body via communication.

Second Embodiment

Next, a second embodiment of present disclosure will be described. In this embodiment as well, a camera CPU 121 detects defocus amounts in spatial frequency bands of levels 1, 2, and 3 as in the first embodiment.

On the other hand, in an interchangeable lens, a memory 152 illustrated in FIG. 1 stores Flg1, Flg2, and Flg3 as flags, which are pieces of information on the spatial frequency band for detecting focus, corresponding to the spatial frequency bands of the levels 1, 2, and 3, respectively. A lens CPU 151 reads and notifies the camera CPU 121 of a flag corresponding to a magnitude of a variably set aberration amount of an imaging optical system (for example, a flag indicating large, medium, and small) and a flag indicating a numerical value corresponding to the aberration amount from the memory 152. The camera CPU 121 notified of the flag performs AF by using a defocus amount in a spatial frequency band of a level corresponding to the flag.

Specifically, the camera CPU 121 performs AF using the defocus amount in the spatial frequency band of the level 1 when the camera CPU 121 is notified of Flg1, and the camera CPU 121 performs AF using the defocus amount in the spatial frequency band of the level 2 when the camera CPU 121 is notified of FIG. 2. The camera CPU 121 performs AF using the defocus amount in the spatial frequency band of the level 3 when the camera CPU 121 is notified of Flg3.

The camera CPU 121 and the lens CPU 151 execute the above-described process according to a computer program.

The lens CPU 151 may notify the camera CPU 121 of a value of the spatial frequency band (for example, 10 lines/mm) as information on the spatial frequency band for detecting focus, instead of the flags indicating the spatial frequency band for detecting focus. In this case, the camera CPU 121 performs AF using a defocus amount that matches the value.

According to each of the above-described embodiments, a good focus detection result can be obtained even when the focus is detected through an imaging optical system in which large aberration occurs, that is, regardless of an aberration amount. In each of the above examples, a description has been given of the case where AF is performed using the focus detection result, but a distance to the object may be measured using the focus detection result. In that case, a good distance measurement result can be acquired.

The focus detection method described in each of the above embodiments is not limited to the above-described lens-interchangeable camera and lens-integrated camera, but can be also applied to various apparatuses such as a video camera and a mobile phone, a personal computer, and a game machine each of which is provided with a camera.

As a variation of the above embodiments, a detailed description will be given of a configuration of a lens apparatus as an interchangeable lens. The lens apparatus includes an optical member configured to change aberration. This optical member can realize a so-called soft-focus effect by aberration. When a user operates an operation member (not illustrated) provided on the lens apparatus, this optical member is driven and a degree of the soft-focus effect changes. The lens apparatus includes a communication controlling unit (not illustrated), and is configured to execute communication via contacts provided in the lens apparatus and a mount of the camera.

When the camera is powered on and power is supplied to the lens apparatus, the camera and the lens apparatus perform initial communication for exchanging attribute information. During the initial communication, the lens apparatus transmits, to the camera, information indicating that the lens apparatus includes the optical member configured to change aberration, or information indicating that the lens apparatus can change aberration. This enables communication between the lens apparatus and the camera based on the change in aberration, and a process performed by the camera based on the change in aberration as described in the above embodiments. When the operation member is operated by the user, the lens apparatus transmits, to the camera, information corresponding to the aberration amount that changes in response to this operation. Zero in this information is a flag described in the above embodiment.

Third Embodiment

Next, a third embodiment of the present disclosure will be described. In the third embodiment, bracketing is performed while an aberration amount, which is an aberration state of an imaging optical system, is changed so that a user can select a desired aberration amount. i.e., a pickup image of a desired degree of soft focus.

Figure 16:
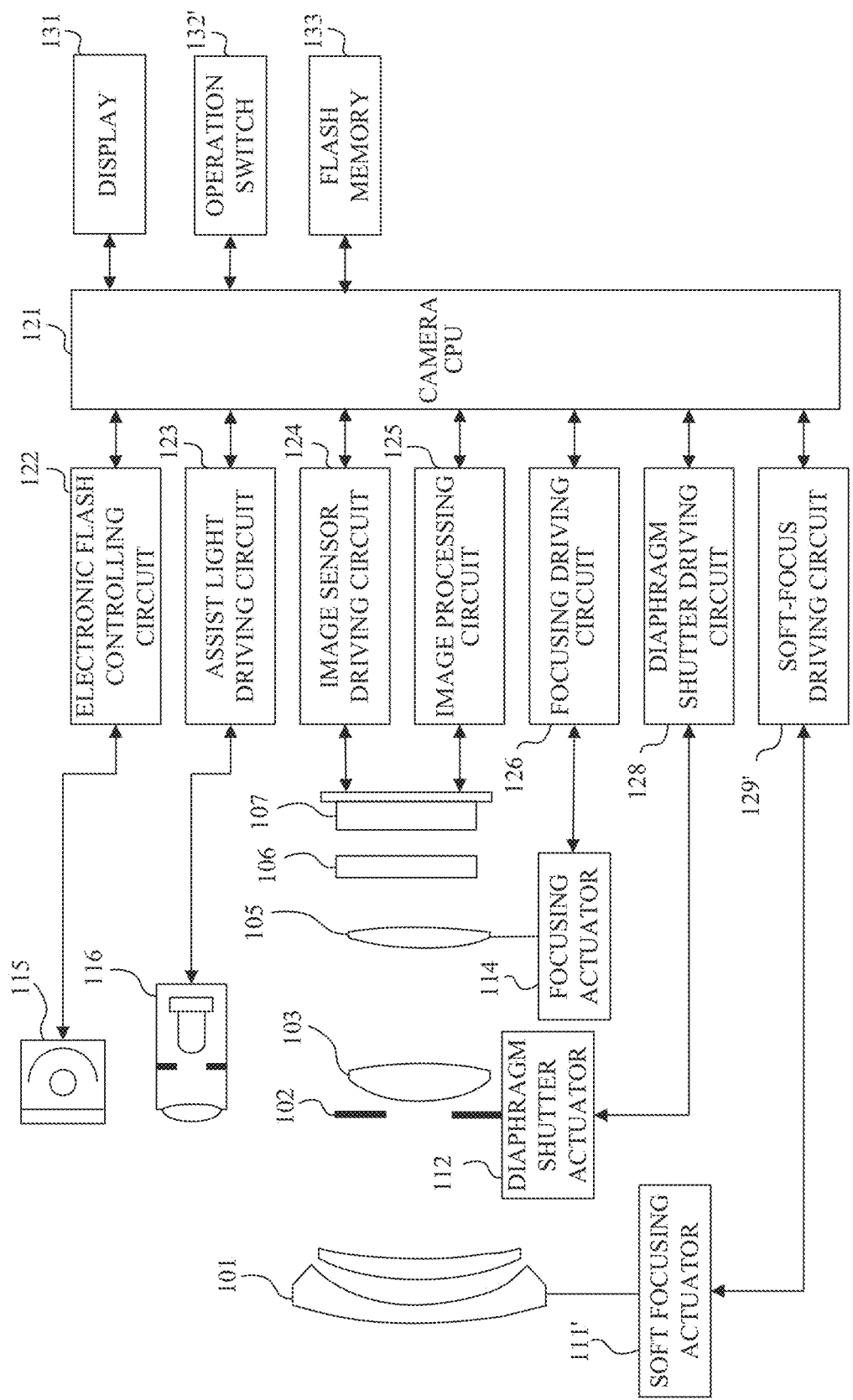
FIG. 16 is a diagram illustrating a configuration of an image pickup apparatus according to the third embodiment.

FIG. 16 illustrates a configuration of a camera in this embodiment. In the drawing, same components as those of the camera illustrated in FIG. 1 are designated by the same reference numerals as those in FIG. 1 and the description thereof will be omitted. In this embodiment as well, an imaging optical system may be provided on an interchangeable lens, but a lens CPU 151 and a lens memory 152 illustrated in FIG. 1 are omitted in FIG. 16.

In this embodiment, a soft-focus effect is acquired by moving a first lens unit 101 and a second lens unit 103 in an optical axis direction. A soft-focus driving circuit 129' drives the first and second lens units 101 and 103 by controlling a soft focusing actuator 111' based on a soft-focus instruction from a camera CPU 121.

As in the first embodiment, an internal memory of the camera CPU 121 stores a correction value calculation coefficient required for AF that uses an output signal from an image sensor 107. A plurality of correction value calculation coefficients are prepared for combinations of a focusing state corresponding to a position of the third lens unit 105, an aberration amount corresponding to positions of the first lens unit 101 and the second lens unit 103, an aperture value, i.e., an F-number, of the imaging optical system, and a set pupil distance and a pixel size of the image sensor 107. When performing AF, the camera CPU 121 calculates a correction value from an image height on the image sensor 107 and a correction value calculation coefficient that corresponds to a combination of a focusing state, an aberration amount, an F-number, a set pupil distance, and a pixel size.

As described in the first embodiment, when the imaging optical system is provided in the interchangeable lens, a memory for storing the correction value calculation coefficients is provided in the interchangeable lens, and the correction value may be calculated by using a correction value calculation coefficient obtained by the camera body from the interchangeable lens via communication when AF is performed.

An operation switch group 132' includes a power switch, a release (image pickup trigger) switch, a soft-focus operation switch, an image pickup mode selection switch, and the like.

Figure 13:
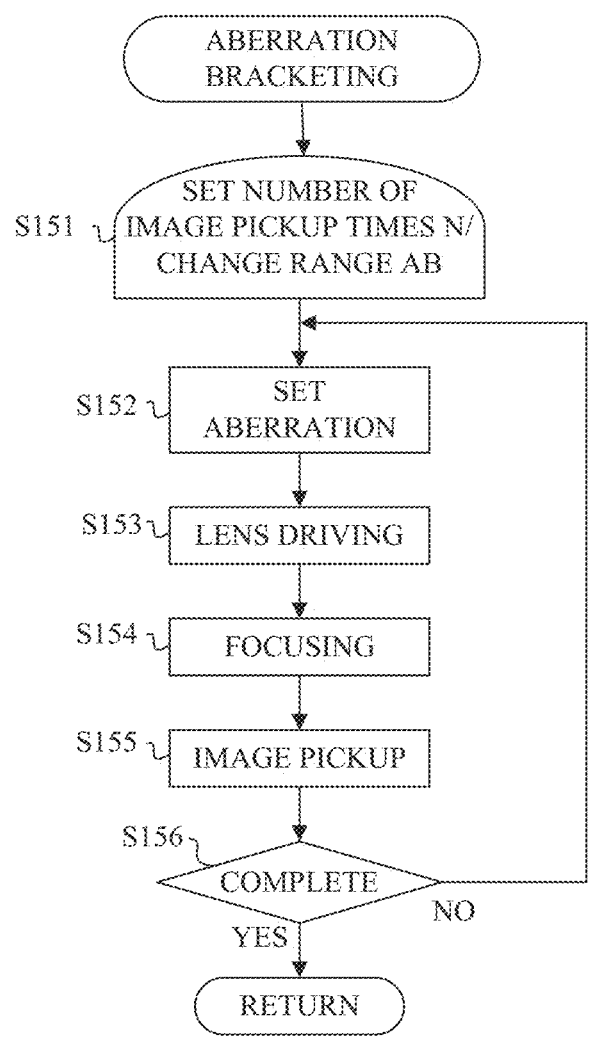
FIG. 13 is a flowchart illustrating processing according to a third embodiment.

The flowchart in FIG. 13 illustrates an aberration bracketing process executed by the camera CPU 12 according to a computer program in this embodiment.

The aberration bracketing is image pickup that acquires pickup images with a respective plurality of aberration amounts, i.e., a degree of soft focus, while the aberration amount of the imaging optical system is changed by moving the first and second lens units 101 and 103, which are also referred to as soft-focus lens units, in the optical axis direction. The aberration bracketing may be one of functions that can be selected by the user via a menu screen of the camera, or may be executed by the user operating an aberration bracket switch included in the operation switch group 132' or provided on the interchangeable lens. When the user instructs the lens-interchangeable camera to perform the aberration bracketing, the camera notifies the interchangeable lens that the aberration bracketing is instructed. When an interchangeable lens including the soft-focus lens is attached to the lens-interchangeable camera, the interchangeable lens may notify the camera that aberration bracketing can be performed.

The camera CPU 12 as a setting unit, which has started the aberration bracketing process, sets a number of image pickup times N and a change range AB of the aberration amount in the aberration bracketing in step S151. The number of image pickup times N and the change range AB of the aberration amount may be set by the camera CPU 12 based on a number of times and a range specified in advance by the user, or may be automatically set by the camera CPU 12.

For example, when the number of image pickup times of N=5 and the aberration range of AB=±2 are set, the camera CPU 12 determines to perform image pickup five times with five aberration amounts of −2, −1, 0, +1, and +2. When the aberration amount is 0, no aberration occurs, and the larger the absolute value of the aberration amount, the larger the aberration amount and the stronger the degree of soft focus. The aberration amount may be expressed by a sign of + or − and an integer as described above, or may be expressed by a natural number, an alphabet, or the like, and the expression method is not limited.

Next, in step S152, the camera CPU 12 sets the current aberration amount to an initial aberration amount (for example, −2) of the plurality of aberration amounts set in step S151.

Next, in step S153, the camera CPU 12 controls the soft focusing actuator 111' to move the first and second lens units 101 and 103 to positions corresponding to the aberration amount set in step S151. When the imaging optical system is provided on the interchangeable lens, the camera CPU 12 instructs (controls) the interchangeable lens to drive the first and second lens units 101 and 103 to positions corresponding to the set aberration amount. This instruction is given every time the aberration amount setting is changed later.

Figure 14A:
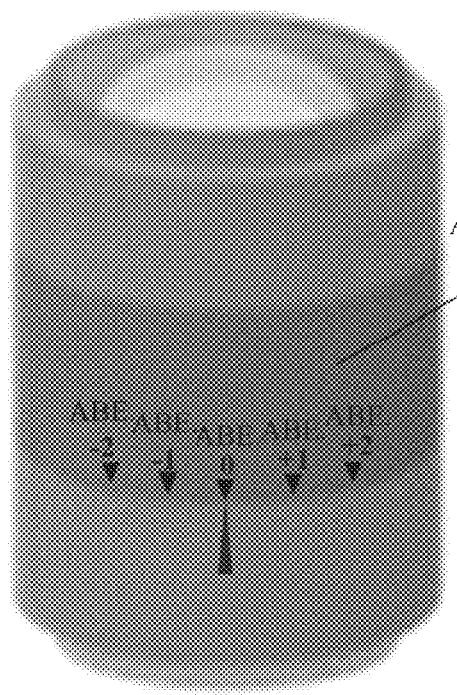
FIGS. 14A and 14B are diagrams illustrating a soft-focus lens according to the third embodiment.
Figure 14B:
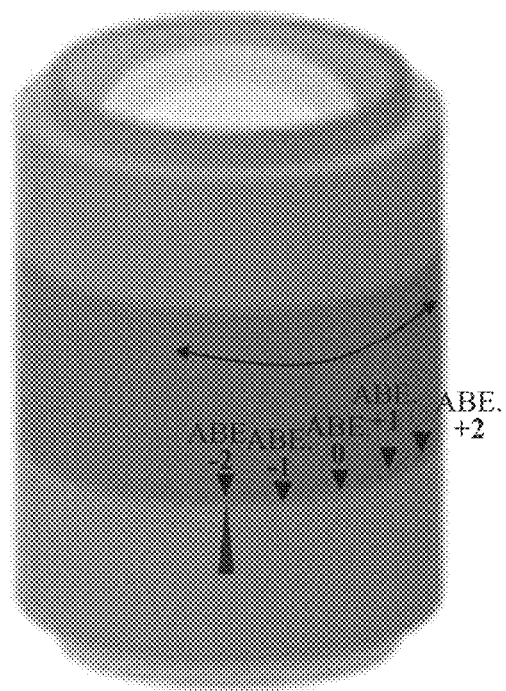

As illustrated in FIGS. 14A and 14B, when the interchangeable lens is provided with an aberration ring that can rotate around the optical axis, the soft focusing actuator 111' may rotate the aberration ring to cause the first and second lens units 101 and 103 to drive in the optical axis direction.

The illustrated aberration ring indicates the aberration amounts (ABE, in the drawing) −2, −1, 0, +1, and +2 in a circumferential direction, and of those aberration amounts, an aberration amount located at a position of a mark provided on a fixed cylinder of the interchangeable lens is displayed to the user as the current aberration amount. When the soft focusing actuator 111' is not provided, the user may manually rotate the aberration ring to move the first and second lens units 101 and 103 to change the aberration amount.

Next, in step S154, the camera CPU 12 calculates the defocus amount in the aberration amount, which has been set in step S153 and previous steps, by using the focus detection process illustrated in FIG. 7, and performs focusing (AF) by driving the third lens unit 105 based on the defocus amount. In this step, AF is performed to correct a focus shift caused by the changes in the aberration amounts and to acquire an image in-focus on the object regardless of the aberration amount. At this time, as described with reference to FIG. 11, the camera CPU 12 selects a defocus amount in a spatial frequency area (level) corresponding to the aberration amount set in step S152.

Next, in step S155, the camera CPU 12 starts the aberration bracketing of the number of imaging times N set in step S151, and stores the image obtained by each image pickup in the flash memory 133.

Next, in step S156, the camera CPU 12 determines whether or not the aberration bracketing of the number of imaging times N has been completed. When the aberration bracketing has not been completed, the process returns to step S152, the next aberration amount is set, and the next image pickup is performed after the first and second lens units 101 and 103 (step S153) is driven and focusing (step S154) is performed. On the other hand, when the aberration bracketing has been completed, the aberration bracketing process is completed and the acquired N pickup images are displayed on the display 131.

FIGS. 15A to 15E illustrate an example of five pickup images acquired by the aberration bracketing and having different aberration amounts. As compared with a pickup image of an aberration amount 0 illustrated in FIG. 15C, pickup images of an aberration amount −1 illustrated in FIG. 15B and of an aberration amount +1 illustrated in FIG. 15D have slightly higher degrees of soft focus. Pickup images of an aberration amount −2 illustrated in FIG. 15A and of an aberration amount +2 illustrated in FIG. 15E are images having higher degrees of soft focus. The pickup images of FIGS. 15B and 15D and the pickup images of FIGS. 15A and 15E have the absolute values of the same aberration amounts of 1 and 2, respectively, but are acquired by moving the first and second lens units 101 and 103 in opposite directions, and therefore are different images.

The degree of soft focus also depends on an arrangement of a plurality of objects or image pickup conditions such as an F-number and an object distance. Thus, by displaying the plurality of pickup images acquired by actual image pickup with different aberration amounts as in this embodiment, the user can easily select the pickup image of the desired degree of soft focus.

In this embodiment, a description has been given of the case of performing bracketing while the aberration amount is changed, but a parameter other than the aberration amount may also be changed in the bracketing. For example, in addition to the aberration amount, a diaphragm state, i.e., an F-number, may be changed. In this case, first the aberration bracketing is performed with an initial F-number (for example, F=4) set, and thereafter the aberration bracketing is performed with a next F-number (for example, F=5.6) set. Thereby, it is possible to acquire a plurality of pickup images having different aberration amounts for different F-numbers, and to increase the number of degrees of soft focus that can be selected by the user.

Fourth Embodiment

Next, a fourth embodiment will be described. In this embodiment, a defocus amount is corrected based on an aberration amount of an imaging optical system.

Here, a description will be given of a case where a soft-focus lens as an interchangeable lens, which can change or variably set a spherical aberration amount, is attached to a lens-interchangeable lens. The soft-focus lens notifies the camera of information on the set aberration amount, which will be also referred to as aberration amount information, via communication.

Figure 17:
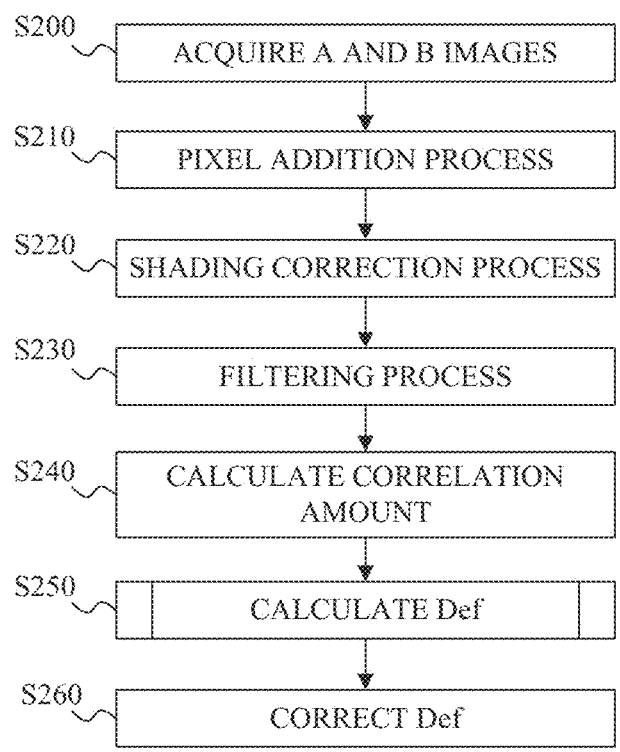
FIG. 17 is a flowchart illustrating a focus detection process according to a fourth embodiment.

The flowchart in FIG. 17 illustrates a focus detection process executed by the camera CPU 12 according to a computer program in this embodiment. The processes from step S200 to step S250 are the same as those of steps S10 to S60 in FIG. 7.

When a defocus amount is calculated in step S250, the camera CPU 12 corrects the defocus amount, which is a focus detection result, using a correction coefficient as correction information described below in step S260.

Figure 18:
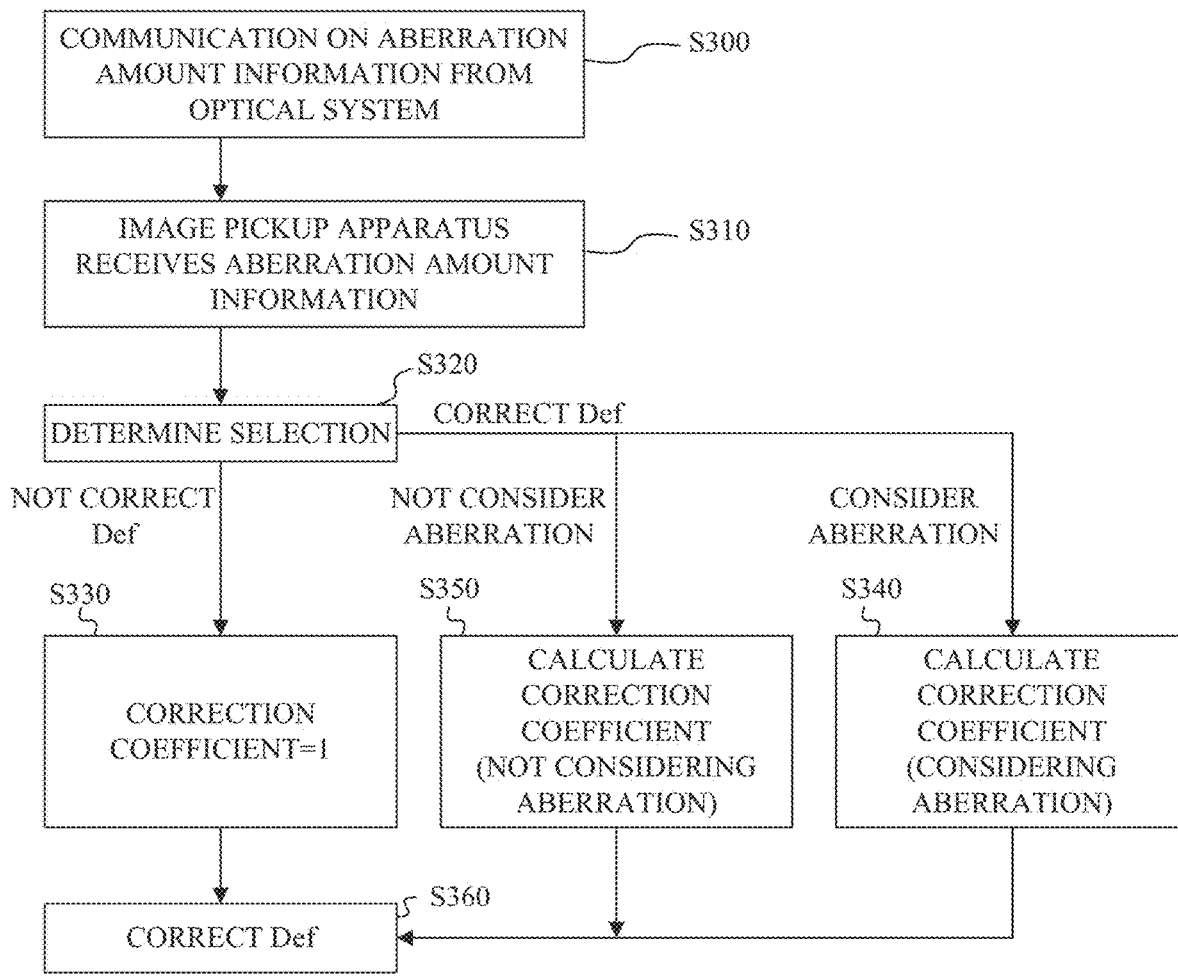
FIG. 18 is a flowchart illustrating a correction coefficient calculation process according to the fourth embodiment.

The flowchart in FIG. 18 illustrates a process of calculating, or acquiring, the correction coefficient. In step S310, the camera CPU 12 receives the aberration amount information transmitted from the soft-focus lens in step S300. The aberration amount information may be aberration information expressed using a Zernike coefficient like wavefront aberration, or may be information on a value of an aberration amount set in the soft-focus lens when the camera CPU 12 recognizes that a soft-focus lens is attached according to a lens ID or the like.

Next, in step S320, the camera CPU 12 determines whether the user selects to correct or not to correct the defocus amount, and that which correction coefficient calculation method the user selects when the correction is to be performed. In this embodiment, as the correction coefficient calculation method, a method of calculating a correction coefficient based on an aberration amount, which is also referred to as a correction coefficient considering aberration, and a method of calculating a correction coefficient not based on the aberration amount, which is also referred to as a correction coefficient not considering aberration, can be selected.

When the selection has been made that the defocus amount is not to be corrected, the process proceeds to step S330, the camera CPU 12 sets the correction coefficient to 1, and the process proceeds to step S360. In this case, the defocus amount calculated in step S250 is used as it is for AF.

On the other hand, when the method of calculating the correction coefficient considering aberration is selected, the process proceeds to step S340, and when the method of calculating the correction coefficient not considering aberration is selected, the process proceeds to step S350.

In step S340, the camera CPU 12 calculates the correction coefficient for each defocus amount and each F-number by using the aberration amount information received from the soft-focus lens. For example, when a fourth-order Zernike coefficient Z representing a spherical aberration amount is obtained as the aberration amount information from the soft-focus lens, a correction coefficient Kgain is calculated using the following equation (2).

$$K\text{gain} = m1 \times Z2 + m1 \times Z + m0 \quad (2)$$

m2, m1, and m0 in the equation (2) are fitting coefficients when the correction coefficient is fitted with the Zernike coefficient Z. The fitting coefficients are stored in the camera CPU 12 as table data for each representative defocus amount and F-number, and fitting coefficients other than the fitting coefficients of the representative defocus amounts and F-numbers are acquired by linear interpolation. The fitting may be first order or third order or higher. The fitting may be performed by a plurality of Zernike coefficients.

The camera CPU 12 may store the defocus amount, the F-number, and the correction coefficient for each aberration amount in advance, and may select the correction coefficient based on the defocus amount, the F-number, and the aberration amount when correcting the defocus amount. The correction coefficient may be different depending on the spatial frequency band (level) in addition to the defocus amount, the F-number, and the aberration amount.

The camera CPU 12 corrects the defocus amount in step S360 using the correction coefficient acquired in this way. Specifically, the defocus amount is corrected using the following equation (3).

$$d = p \times K \times K\text{gain} \quad (3)$$

In the equation (3), d represents a corrected defocus amount, p represents an image shift amount, and K represents a conversion coefficient used for conversion from the image shift amount to the defocus amount.

FIGS. 19A to 19C illustrate an example of correction coefficients based on spherical aberration amounts. In each figure, a horizontal axis represents defocus amounts, a left side of "in focus" is the front focus side, a right side of the "in focus" is the rear focus side, and the "in focus" is a position where the defocus amount is almost 0. A vertical axis represents correction coefficients. FIG. 19A illustrates correction coefficients when the aberration amount is small. The correction coefficients in this case are values with which the front focus side and the rear focus side are almost symmetrical with respect to the "in focus". On the other hand, FIGS. 19B and 19C illustrate correction coefficients when the aberration amounts are large. In these cases, the correction coefficients on the front focus side and the rear focus side are asymmetrical with respect to the "in-focus".

In step S350, the camera CPU 12 calculates the defocus amount and the correction coefficient for each F-number without using the aberration amount information. Thereafter, the defocus amount is corrected in step S360 using the correction coefficient.

In this embodiment, a description has been given of the case where the soft-focus lens having the variable aberration amount is attached to the camera, but even when the aberration amount is not variable, even if a lens having a large aberration amount is attached to the camera, the same processes as in this embodiment can be applied.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to each of the above embodiments, a good focus detection result can be acquired even when focus is detected via an optical system in which large aberration occurs. Further, according to each of the above embodiments, it is possible to generate an image with a degree of soft focus desired by a user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2020-192053, filed on Nov. 18, 2020, and 2021-122272, filed on Jul. 27, 2021 which are hereby incorporated by reference herein in their entirety.

What is claimed is:

1. An image pickup apparatus comprising:
    an image sensor including a pair of focus detection pixels configured to receive light beams that have passed through different areas in an exit pupil of an imaging optical system;
    at least one processor; and
    at least one memory coupled to the at least one processor storing instructions that, when executed by the at least one processor, cause the at least one processor to function as:
    a focus detection unit configured to detect focus of the imaging optical system by using a pair of focus detection signals which is generated by using output signals from the pair of focus detection pixels,
    wherein the focus detection unit can detect the focus in a plurality of spatial frequency bands, and
    wherein the focus detection unit acquires a focus detection result to be used in a spatial frequency band corresponding to an aberration amount of spherical aberration of the imaging optical system, the spatial frequency band being included in the plurality of spatial frequency bands.

2. The image pickup apparatus according to claim 1,
    wherein a lens apparatus including the imaging optical system is detachably attachable to the image pickup apparatus,
    wherein the focus detection unit acquires, from the lens apparatus, (a) information on the aberration amount or (b) information on a spatial frequency band for detecting the focus, the spatial frequency band corresponding to the aberration amount, and wherein the focus detection unit acquires the focus detection result to be used in a spatial frequency band selected based on the information from the plurality of spatial frequency bands.

3. The image pickup apparatus according to claim 1, wherein a lens apparatus including the imaging optical system is detachably attachable to the image pickup apparatus, wherein the focus detection unit acquires, from the lens apparatus, (a) information on the aberration amount or (b) information on a spatial frequency band for detecting the focus, the spatial frequency band corresponding to the aberration amount, and wherein the focus detection unit selects, based on the information, the focus detection result to be used from focus detection results in the plurality of spatial frequency bands.

4. The image pickup apparatus according to claim 1, wherein the focus detection unit acquires the focus detection result to be used in a spatial frequency band, which lowers as the aberration amount increases.

5. The image pickup apparatus according to claim 1, wherein the focus detection unit acquires the focus detection result to be used in a spatial frequency band, which is different depending on an F-number of the imaging optical system.

6. The image pickup apparatus according to claim 1, wherein the image pickup apparatus provides control on focusing of the imaging optical system based on the focus detection result to be used.

7. A lens apparatus detachably attached to the image pickup apparatus according to claim 1 and having an imaging optical system, the lens apparatus comprising:

at least one processor; and at least one memory coupled to the at least one processor storing instructions that, when executed by the at least one processor, cause the at least one processor to function as:

a memory unit configured to store (a) information on an aberration amount of spherical aberration of the imaging optical system or (b) information on a spatial frequency band for detecting focus, the spatial frequency band corresponding to the aberration amount; and a notification unit configured to notify the image pickup apparatus of the information.

8. The lens apparatus according to claim 7, wherein the aberration amount of the imaging optical system can be changed.

9. A control method for an image pickup apparatus that includes an image sensor including a pair of focus detection pixels configured to receive light beams that have passed through different areas in an exit pupil of an imaging optical system, the control method comprising:

generating a pair of focus detection signals by using output signals from the pair of focus detection pixels; and acquiring a focus detection result to be used in a spatial frequency band corresponding to an aberration amount of spherical aberration of the imaging optical system, the spatial frequency band being included in a plurality of spatial frequency bands in which focus of the imaging optical system can be detected by using the pair of focus detection signals.

10. A control method for a lens apparatus that is detachably attached to an image pickup apparatus for which the control method according to claim 9 is used and includes an imaging optical system, the control method comprising:

storing (a) information on an aberration amount of spherical aberration of the imaging optical system or (b) information on a spatial frequency band for detecting focus, the spatial frequency band corresponding to the aberration amount; and notifying the image pickup apparatus of the information.

11. A non-transitory computer-readable storage medium storing a computer program that causes a computer of the lens apparatus to execute the control method according to claim 10.

12. A non-transitory computer-readable storage medium storing a computer program that causes a computer of the image pickup apparatus to execute the control method according to claim 9.

* * * * *